Dec. 21, 1926.
H. J. RAHILLY
1,611,230
CONNECTING DEVICE
Filed Jan. 10, 1923
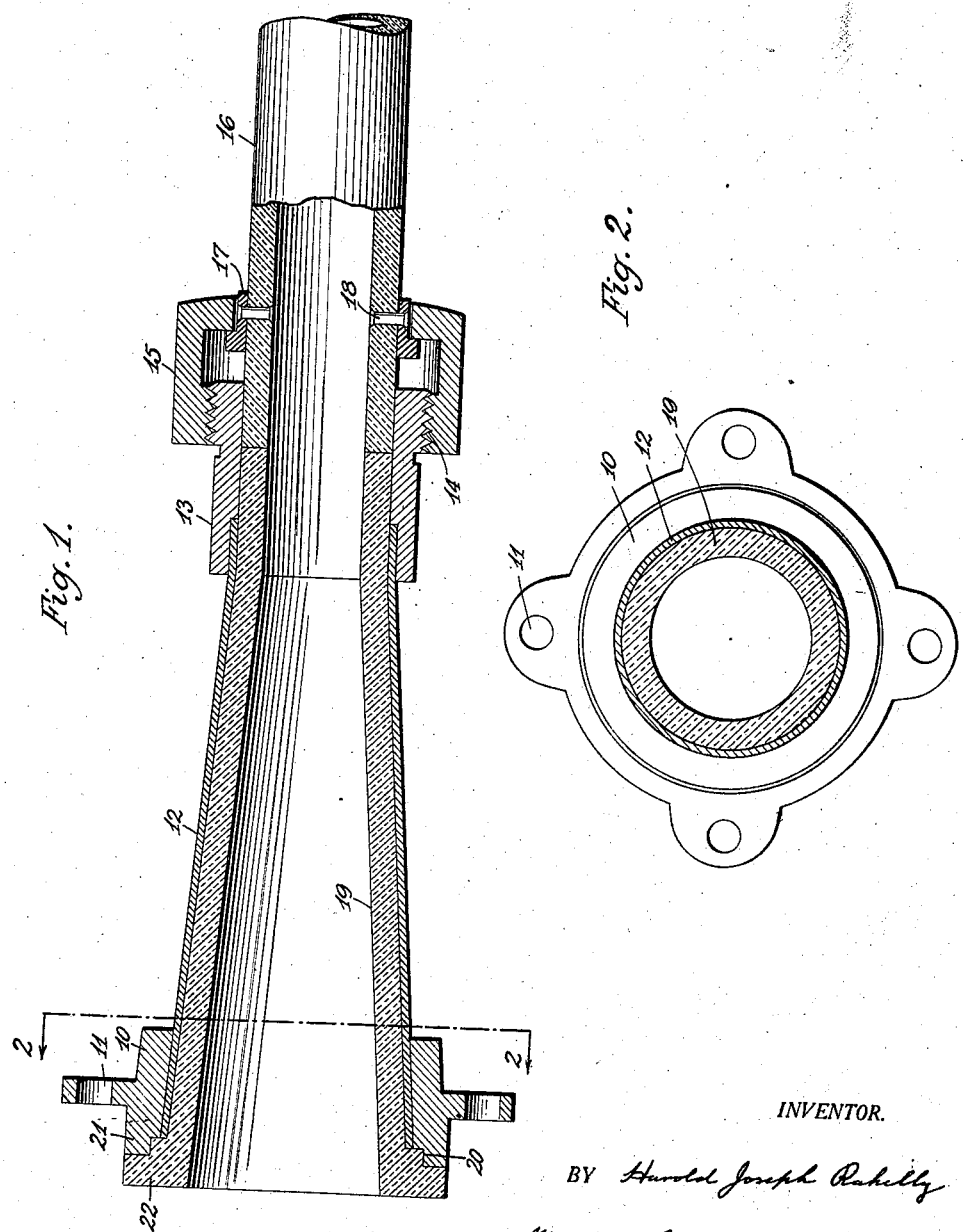
INVENTOR.
BY Harold Joseph Rahilly
Marks + Clerk ATTORNEYS.

Patented Dec. 21, 1926.

1,611,230

UNITED STATES PATENT OFFICE.

HAROLD JOSEPH RAHILLY, OF BUTTE, MONTANA, ASSIGNOR TO CEMENT GUN COMPANY, INC., OF ALLENTOWN, PENNSYLVANIA, A CORPORATION OF NEW YORK.

CONNECTING DEVICE.

Application filed January 10, 1923. Serial No. 611,785.

This invention relates to devices for connecting a flexible hose to a tank or the like from which material is to be expelled through said hose. It has been designed primarily for use in connection with machines such as disclosed in United States Letters Patent #991,814, issued to McElroy Shepherd Co. on May 9, 1911, for mixing and applying plastic or adhesive materials by projection, that is, with the help of compressed air. The object of the invention is to provide a strong and very effective connection between the mixing machine and the hose by means of which the material is to be applied to a wall or other surface. Another object is to provide tight joints at the places of connection between the coupling and the tank as well as between the coupling and the flexible hose. Another object is to hold a certain part of the connecting device securely in place, yet to make it readily removable and exchangeable.

As constructed hitherto, such connecting devices have been made with a piece of rubber tube attached at both ends as by riveting to connecting members which served to connect the coupling to the tank and to the hose. This rubber tube even if made very strong, is apt to swell and bulge outwardly under the influence of compressed air. According to the present invention I have provided a metal casing surrounding such rubber tube, thus yielding a very strong and durable construction. These and other objects of the invention will appear from the description following hereinafter and the novel features will be pointed out in the appended claims.

The accompanying drawings show an example of my invention without defining its limits. In these drawings Fig. 1 is a longitudinal section through my improved connecting device and Fig. 2 is a transverse section on line 2—2 of Fig. 1.

The connecting device illustrated in the drawings comprises a gland member 10 having lugs 11 for attaching the device to a tank or the like. Connected rigidly with said member 10, as by welding, is a metal sleeve 12 the other end of which is connected rigidly, as by welding, to a nipple 13 which is provided with a screw thread 14 for connection with a coupling nut 15 forming part of a flexible hose 16. The nut 15 is held on the hose 16 by means of a flanged collar 17 attached to said hose as by rivets 18. The tube 12 as shown in Fig. 1 is preferably reduced from its end adjacent to the member 11 toward its other end and into said tube is fitted a rubber sleeve 19 which is also made conical to fit the inner surface of the tube 12. The rubber tube 19 is formed with a shoulder 20 fitting a corresponding shoulder 21 in the end surface of the gland member 10. Adjacent to the shoulder 20, the rubber tube 19 is provided with a flange 22 located outside of the end surface of the member 10.

The rubber tube 19 forms a lining for the metal tube 12 and at its reduced end it is of a diameter equal to the inner diameter of the rubber hose 16. As shown, the rubber tube 16 extends for a certain distance within the nipple 13 and is adapted to be brought tightly against the end of the rubber lining 19 by the engagement of the nut 15 with the threads of the nipple 13. It will be seen that the rubber tube 19 forms with the hose 16 a continuous passage within the connecting member, this passage being smooth, without any projecting or recessed portions against or in which material might accumulate during the operation of the device.

The flange 22 on the rubber sleeve 19 not only holds said sleeve securely in position and prevents its being pulled out from the gland but it also serves as packing between the gland member 10 and the tank or the like to which the connecting member is to be attached. A tight joint at the junction of the nipple 13 with the hose 16 is provided by the pressure with which said hose is pressed into contact with the rubber sleeve 19. A very strong and substantial delivery connection between the tank and the flexible hose is thus established. The rubber sleeve 19 which is exposed to considerable wear is readily removable and exchangeable by simply disconnecting the gland member 10 from the tank.

Various modifications may be made without departing from the nature of my invention as set forth in the appended claims.

I claim:

1. A connecting device for connecting a hose to a tank comprising a tapered sleeve of resilient liquid-tight material, said sleeve having at the larger end thereof a laterally extending flange, a clamping member adapted to be bolted to the wall of said tank and clamp said flange into liquid-tight engagement with said tank, a tapered metallic reinforcing sleeve having one end thereof secured to said clamping member and snugly encasing said resilient sleeve, a nipple secured to the other end of said metallic sleeve, said clamping member, metallic sleeve and nipple being rigidly secured together to form a unitary tapered structure from which said resilient sleeve may be readily removed from the larger end thereof.

2. A connecting device for connecting a hose to a tank comprising a clamping member adapted to be bolted to the wall of said tank, a screwthreaded nipple, a tapered metallic sleeve connecting said clamping member and secured thereto to form a unitary structure, said sleeve extending into said nipple and clamping member to provide a smooth tapered interior bore, a tapered sleeve of resilient liquid-tight material snugly encased within said tapered bore, said resilient sleeve having at its larger end a laterally extending flange adapted to be engaged by said clamping member and clamped against the wall of said tank to form a liquid-tight joint therewith, the smaller end of said resilient sleeve terminating short of the end of said nipple, a flanged collar adapted to be secured to a rubber hose, and a nut adapted to be engaged with said flanged collar and said nipple to clamp the end of said hose into tight engagement with the smaller end of said resilient sleeve.

3. A connecting device for connecting a hose to a tank, comprising an attaching member adapted to be secured to the wall of said tank, a relatively thin metallic sleeve, and a nipple adapted to coact with a coupling nut attached to said hose, said sleeve being rigidly secured at its opposite ends to said attaching member and nipple to form a unitary element, and a tapered sleeve of resilient liquid-tight material inserted within said unitary element and fitting the bore thereof, and having at one end thereof an outwardly extending flange abutting against the outer surface of said attaching member, the other end of said resilient sleeve terminating within the bore of said nipple at a distance from the outer end thereof.

4. A connecting device for connecting a hose to a tank, comprising an attaching member adapted to be secured to the wall of said tank and having a tapered bore, a relatively thin tapering metallic sleeve having the larger end thereof secured within the tapered bore of said attaching member, a nipple secured to the other end of said tapered sleeve and adapted to coact with a coupling nut on said hose, and a tapered sleeve of resilient liquid-tight material fitting within said tapered metallic sleeve and having an outwardly extending flange at its larger end abutting against the outer face of said attaching member, the other end of said resilient sleeve terminating within the bore of said nipple at a distance from the outer end thereof.

5. A connecting device for connecting a hose to a tank, comprising an attaching member adapted to be secured to the wall of said tank, a relatively thin tapering metallic sleeve integrally united at the larger end thereof to said attaching member, a nipple integrally united to the smaller end of said metallic sleeve and adapted to coact with a clamping nut on said hose, and a tapered sleeve of resilient liquid-tight material arranged within said metallic sleeve and having an outwardly extending flange at its larger end abutting against the outer face of said attaching member, said resilient sleeve at its other end terminating within the bore of said nipple at a distance from the outer end thereof.

6. A connecting device of the kind described, comprising a tapering metallic sleeve having attaching members at opposite ends thereof, said sleeve and attaching members being secured together to form a unitary element, and a tapered sleeve of resilient liquid-tight material inserted within said unitary element from the larger end thereof and fitting the bore thereof, and having at its larger end an outwardly extending flange abutting against the surface of the attaching member at the larger end of said element.

In testimony whereof I have affixed my signature.

HAROLD JOSEPH RAHILLY.